(12) United States Patent
Gintis et al.

(10) Patent No.: US 10,764,148 B2
(45) Date of Patent: Sep. 1, 2020

(54) METHODS, SYSTEMS, AND COMPUTER READABLE MEDIA FOR NETWORK TRAFFIC STATISTICS COLLECTION

(71) Applicant: Keysight Technologies, Inc., Minneapolis, MN (US)

(72) Inventors: Noah Steven Gintis, Westlake Village, CA (US); Vinod Joseph, Thousand Oaks, CA (US); Alina Crina Balan, Camarillo, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 316 days.

(21) Appl. No.: 15/826,628

(22) Filed: Nov. 29, 2017

(65) Prior Publication Data

US 2019/0166008 A1 May 30, 2019

(51) Int. Cl.
G06F 15/173 (2006.01)
H04L 12/24 (2006.01)
H04L 12/26 (2006.01)

(52) U.S. Cl.
CPC .......... *H04L 41/142* (2013.01); *H04L 43/062* (2013.01); *H04L 43/08* (2013.01); *H04L 43/50* (2013.01); *H04L 43/045* (2013.01)

(58) Field of Classification Search
None
See application file for complete search history.

(56) References Cited

U.S. PATENT DOCUMENTS

| 5,343,463 | A | 8/1994 | Van Tetering et al. |
| 5,477,531 | A | 12/1995 | McKee et al. |
| 5,600,632 | A | 2/1997 | Schulman |
| 5,742,760 | A | 4/1998 | Picazo, Jr. et al. |
| 5,787,253 | A | 7/1998 | McCreery et al. |
| 5,787,283 | A | 7/1998 | Chin et al. |

(Continued)

FOREIGN PATENT DOCUMENTS

| EP | 2 429 128 A1 | 3/2012 |
| EP | 2 854 340 B1 | 10/2016 |

OTHER PUBLICATIONS

Notice of Allowance and Fee(s) Due for U.S. Appl. No. 12/870,729 (dated Aug. 31, 2012).

(Continued)

*Primary Examiner* — Padma Mundur

(57) ABSTRACT

Methods, systems, and computer readable media for network traffic statistics collection are disclosed. One method for network traffic statistics collection includes during testing of a system under test (SUT): receiving a first trigger message indicating a first message group context for statistics collection; receiving, from the SUT, a first test message of a plurality of test messages, wherein the first test message includes a first message group identifier (MGID) and a second MGID, wherein the first MGID is associated with the first message group context and the second MGID is associated with a second message group context; and performing, using the first MGID, statistics collection associated with the first message group context. The method may also include changing from the first message group context to the second message group context during the test and using the second message group context for statistics collection.

16 Claims, 8 Drawing Sheets

(56) References Cited

U.S. PATENT DOCUMENTS

| | | | |
|---|---|---|---|
| 5,850,386 A | 12/1998 | Anderson et al. | |
| 5,878,032 A | 3/1999 | Mirek et al. | |
| 5,982,753 A | 11/1999 | Pendleton et al. | |
| 6,028,847 A | 2/2000 | Beanland | |
| 6,041,053 A | 3/2000 | Douceur et al. | |
| 6,065,053 A | 5/2000 | Nouri et al. | |
| 6,088,777 A | 7/2000 | Sorber | |
| 6,172,989 B1 | 1/2001 | Yanagihara et al. | |
| 6,233,256 B1 | 5/2001 | Dieterich et al. | |
| 6,252,891 B1 | 6/2001 | Perches | |
| 6,295,557 B1 | 9/2001 | Foss et al. | |
| 6,360,332 B1 | 3/2002 | Weinberg et al. | |
| 6,389,532 B1 | 5/2002 | Gupta | |
| 6,446,121 B1 | 9/2002 | Shah et al. | |
| 6,545,979 B1 | 4/2003 | Poulin | |
| 6,601,098 B1 | 7/2003 | Case et al. | |
| 6,717,917 B1 | 4/2004 | Weissberger et al. | |
| 6,728,929 B1 | 4/2004 | Luong | |
| 6,789,100 B2 | 9/2004 | Nemirovsky et al. | |
| 6,820,034 B2 | 11/2004 | Hanes et al. | |
| 6,823,219 B2 | 11/2004 | Lee et al. | |
| 6,888,818 B1 | 5/2005 | Gubbi | |
| 6,910,061 B2 | 6/2005 | Hu et al. | |
| 6,950,405 B2 | 9/2005 | Van Gerrevink | |
| 6,956,866 B1* | 10/2005 | Li | H04L 43/022 370/449 |
| 7,007,089 B2 | 2/2006 | Freedman | |
| 7,035,223 B1 | 4/2006 | Burchfiel et al. | |
| 7,088,735 B1 | 8/2006 | Roehr, Jr. et al. | |
| 7,187,683 B1 | 3/2007 | Sandoval et al. | |
| 7,295,555 B2 | 11/2007 | Elzur | |
| 7,406,089 B1 | 7/2008 | Rahim et al. | |
| 7,443,870 B2 | 10/2008 | Zioulas et al. | |
| 7,451,458 B2 | 11/2008 | Tuchow | |
| 7,489,706 B2 | 2/2009 | Hatley et al. | |
| 7,561,559 B2 | 7/2009 | Hannel et al. | |
| 7,594,159 B2 | 9/2009 | Fujikami et al. | |
| 7,643,431 B2 | 1/2010 | Pepper | |
| 7,826,377 B2 | 11/2010 | Pepper | |
| 7,826,381 B1 | 11/2010 | Kastuar et al. | |
| 8,050,175 B2 | 11/2011 | Pepper | |
| 8,219,675 B2 | 7/2012 | Ivershen | |
| 8,248,926 B2 | 8/2012 | Bockwoldt et al. | |
| 8,310,942 B2 | 11/2012 | Gintis et al. | |
| 8,391,157 B2 | 3/2013 | Ginsberg et al. | |
| 8,582,466 B2 | 11/2013 | Gintis et al. | |
| 9,531,620 B2 | 12/2016 | Ciodaru et al. | |
| 9,553,786 B2 | 1/2017 | Bergeron | |
| 9,654,303 B2 | 5/2017 | Joyner et al. | |
| 10,178,015 B2 | 1/2019 | Badea et al. | |
| 10,193,773 B2 | 1/2019 | Ciodaru et al. | |
| 2001/0016867 A1 | 8/2001 | Hu et al. | |
| 2002/0172158 A1 | 11/2002 | Hoefelmeyer et al. | |
| 2002/0183969 A1 | 12/2002 | Hanes et al. | |
| 2003/0033025 A1 | 2/2003 | Lee et al. | |
| 2004/0037277 A1 | 2/2004 | Mathews et al. | |
| 2004/0052259 A1 | 3/2004 | Garcia et al. | |
| 2004/0131013 A1 | 7/2004 | Ise et al. | |
| 2004/0158744 A1 | 8/2004 | Deng et al. | |
| 2004/0252686 A1 | 12/2004 | Hooper et al. | |
| 2005/0013251 A1 | 1/2005 | Wang et al. | |
| 2005/0068891 A1 | 3/2005 | Arsikere et al. | |
| 2005/0286564 A1 | 12/2005 | Hatley et al. | |
| 2006/0088060 A1 | 4/2006 | Fujikami et al. | |
| 2006/0153078 A1 | 7/2006 | Yasui | |
| 2007/0115833 A1 | 5/2007 | Pepper et al. | |
| 2007/0195707 A1 | 8/2007 | Cidon et al. | |
| 2007/0291654 A1 | 12/2007 | Pepper | |
| 2008/0112332 A1* | 5/2008 | Pepper | H04L 43/028 370/250 |
| 2008/0317233 A1 | 12/2008 | Rey et al. | |
| 2009/0310491 A1 | 12/2009 | Ginsberg et al. | |
| 2010/0034100 A1 | 2/2010 | Beyers | |
| 2010/0069092 A1 | 3/2010 | Bajpai et al. | |
| 2010/0074135 A1 | 3/2010 | Pepper | |
| 2011/0069620 A1 | 3/2011 | Gintis et al. | |
| 2011/0078319 A1 | 3/2011 | Ishida | |
| 2011/0280137 A1 | 11/2011 | Bockwoldt et al. | |
| 2012/0051234 A1 | 3/2012 | Gintis et al. | |
| 2013/0329572 A1 | 12/2013 | Gintis | |
| 2013/0331082 A1 | 12/2013 | Topaltzas et al. | |
| 2013/0343389 A1 | 12/2013 | Stroud et al. | |
| 2013/0346628 A1 | 12/2013 | Canion et al. | |
| 2013/0346719 A1 | 12/2013 | Tomlinson et al. | |
| 2013/0346736 A1 | 12/2013 | Cook et al. | |
| 2013/0346987 A1 | 12/2013 | Raney et al. | |
| 2013/0347103 A1 | 12/2013 | Veteikis et al. | |
| 2014/0016479 A1 | 1/2014 | Coomber et al. | |
| 2014/0269337 A1 | 9/2014 | Gintis | |
| 2016/0057040 A1 | 2/2016 | Bergeron | |
| 2017/0164186 A1 | 6/2017 | Yong et al. | |
| 2017/0272352 A1 | 9/2017 | Badea et al. | |
| 2018/0013839 A1 | 1/2018 | Noldus et al. | |
| 2018/0131586 A1 | 5/2018 | Ciodaru et al. | |
| 2019/0014394 A1* | 1/2019 | Anand | H04J 4/0267 |

OTHER PUBLICATIONS

Non-Final Office Action for U.S. Appl. No. 12/870,729 (dated Jul. 2, 2012).

European Search Report for European Patent Application Serial No. 11008066.0 (dated Feb. 10, 2012).

Notice of Allowance and Fee(s) Due for U.S. Appl. No. 12/627,925 (dated Aug. 26, 2011).

Examiner Initiated Interview Summary and Final Office Action for U.S. Appl. No. 12/627,925 (dated Jun. 17, 2011).

Non-Final Office Action for U.S. Appl. No. 12/627,925 (dated Jan. 21, 2011).

Notice of Allowance and Fee(s) Due for U.S. Appl. No. 11/558,855 (dated Nov. 18, 2009).

Final Office Action for U.S. Appl. No. 11/558,855 (dated Oct. 15, 2009).

Non-Final Office Action for U.S. Appl. No. 11/558,855 (dated Mar. 24, 2009).

Sadasivan et al., "Architecture for IP Flow Information Export," Network Working Group, pp. 1-31 (Mar. 2009).

Ixia, "IxExplorer User's Guide," Revision 2.1.0, pp. 1-384 (Nov. 1, 1999).

Ixia, "Specifications for Load Modules—Multilayer Gigibit Ethernet for LM1000LX, LM1000SX, LM1000GBIC, LM1000T, Product Specification Sheet," pp. 1-2 (Undated).

Ixia, "The Ixia 200 Traffic Generator and Analyzer, Product Description," pp. 1-2 (1997-1999).

Brownlee et al., "Traffic Flow Measurement: Architecture," Network Working Group, The University of Auckland, GTE Laboratories, Inc. and GTE Internetworking, pp. 1-49 (Oct. 1999).

Ixia, "Ixia 200 Chassis, Product Description," pp. 1 (Undated).

Notice of Allowance and Fee(s) Due and Examiner-Initiated Interview Summary for U.S. Appl. No. 15/347,756 (dated Sep. 18, 2018).

Decision to grant a European patent pursuant Article 97(1) EPC for European Patent Application No. 14 002 802.8 (dated Sep. 29, 2018).

Communication under Rule 71(3) EPC for European Patent Application No. 14 002 802.8 (dated May 3, 2016).

Final Office Action for U.S. Appl. No. 13/965,037 (dated Nov. 5, 2015).

Decision to grant a European patent pursuant to Article 97(1) EPC for European Patent Application Serial No. 11 008 066.0 (dated Sep. 3, 2015)

Communication under Rule 71(3) EPC for European Application Serial No. 11 008 066.0 (dated May 13, 2015).

Non-Final Office Action for U.S. Appl. No. 13/965,037 (dated Apr. 24, 2015).

Notification of European publication number and information on the application of Article 67(3) EPC European Patent Application No. 14 002 802.8 (dated Mar. 4, 2015).

Non-Final Office Action for U.S. Appl. No. 13/832,137 (dated Nov. 3, 2016).

(56) References Cited

OTHER PUBLICATIONS

Extended European Search Report for European Patent Application No. 14 002 802.8 (dated Feb. 26, 2015).

Invitation pursuant to Article 94(3) and Rule 71(1) EPC for European Patent Application Serial No. 11 008 066.0 (dated Mar. 10, 2014).

Notice of Allowance and Fee(s) Due for U.S. Appl. No. 13/672,335 (dated Sep. 12, 2013).

Communication pursuant to Article 94(3) EPC for European Patent Application No. 11 008 066.0 (dated Mar. 15, 2013).

Notification of European publication number and information on the application of Article 67(3) EPC European Patent Application Serial No. 11 008 066.0 (dated Feb. 15, 2012).

Torrents, "Open Source Traffic Analyzer," KTH Information and Communication Technology, pp. 1-62 (2010).

"Border Gateway Protocol (BGP) Conformance and Performance Testing Sample Test Plans," Ixia, pp. 1-34 (2004).

Non-Final Office Action for U.S. Appl. No. 15/077,832 (dated Apr. 3, 2018).

Commonly-assigned, co-pending U.S. Appl. No. 15/347,756 for "Methods, Systems, and Computer Readable Media for Distributed Network Packet Statistics Collection in a Test Environment," (Unpublished, filed Nov. 9, 2016).

Notice of Allowance and Fee(s) Due, Applicant-Initated Interview Summary and AFCP 2.0 Decision for U.S. Appl. No. 14/465,453 (dated Sep. 14, 2016).

Final Office Action for U.S. Appl. No. 14/465,453 (dated Jun. 16, 2016).

Applicant-Initiated Interview Summary for U.S. Appl. No. 14/465,453 (dated Mar. 3, 2016).

Applicant-Initiated Interview Summary for U.S. Appl. No. 14/465,453 (dated Mar. 1, 2016).

Non-Final Office Action for U.S. Appl. No. 14/465,453 (dated Dec. 18, 2015).

Krishnan, "Flow-aware Real-time SDN Analytics (FRSA)," http://blog.sflow.com/2014/02/flow-aware-real-time-sdn-analytics-frsa.html, pp. 1-12 (Feb. 5, 2014).

Notice of Allowance and Fee(s) Due for U.S. Appl. No. 15/077,832 (dated Aug. 29, 2018).

* cited by examiner

| MESSAGE | MGID-CONTEXT 1 | MGID-CONTEXT 2 | MGID-CONTEXT 3 | DEST IP (CONTEXT 1) | SOURCE IP (CONTEXT 2) | APP ID (CONTEXT 3) | QOS VALUE (CONTEXT 3) |
|---|---|---|---|---|---|---|---|
| 1 | 1 | 1 | 1 | IP1 | IP3 | 24 | 1 |
| 2 | 1 | 2 | 2 | IP1 | IP4 | 24 | 2 |
| 3 | 2 | 1 | 3 | IP2 | IP3 | 8 | 1 |
| 4 | 2 | 2 | 4 | IP2 | IP4 | 8 | 2 |

METHODS, SYSTEMS, AND COMPUTER READABLE MEDIA FOR NETWORK TRAFFIC STATISTICS COLLECTION

TECHNICAL FIELD

The subject matter described herein relates to collecting network traffic statistics. More particularly, the subject matter described herein relates to methods, systems, and computer readable media for network traffic statistics collection.

BACKGROUND

Network traffic statistics collection is performed by test systems that transmit simulated messages to one or more devices under test. For example, one type of test system transmits simulated messages a device under test over network ports of the test system, receives messages from the device under test, and generates statistics grouped by message group identifiers (MGIDs) inserted in the messages by the test system. In some tests, multiple statistics may be generated for each MGID. Generating statistics for an MGID may include looking up the MGID in a table, locating the column in the table containing the statistic to be updated, and updating the statistic. As the number of MGIDs increases, the size of the statistics table increases and the amount of processing required to insert a statistic in the table also increases. In addition, as the table size increases, operations on the table (such as sorting, grouping, inserting, etc.) require an increased amount of processing resources and/or time to complete.

Some test operators perform multiple tests to gather statistics related to different messages or data therein. For example, in one example network traffic statistics collection system, MGIDs may be assigned based on a message group context (e.g., a set or tuple of one or more message header parameters). In this example, statistics are collected and/or generated at a receive port or related device. Such a port or related device may have limited resources that restrict statistics collection to a single message group context per test. Stopping and reconfiguring a test so that related hardware and software are configured to collect statistics for a different message group context can be cumbersome and inefficient.

Accordingly, there exists a need for improved network traffic statistics collection.

SUMMARY

Methods, systems, and computer readable media for network traffic statistics collection are disclosed. One method for network traffic statistics collection includes: during testing of a system under test (SUT): receiving a first trigger message indicating a first message group context for statistics collection; receiving, from the SUT, a first test message of a plurality of test messages, wherein the first test message includes a first message group identifier (MGID) and a second MGID, wherein the first MGID is associated with the first message group context and the second MGID is associated with a second message group context; and performing, using the first MGID, statistics collection associated with the first message group context.

One system includes at least one processor and a test system implemented using the at least one processor. The test system is configured for: during testing of a SUT: receiving a first trigger message indicating a first message group context for statistics collection; receiving, from the SUT, a first test message of a plurality of test messages, wherein the first test message includes a first MGID and a second MGID, wherein the first MGID is associated with the first message group context and the second MGID is associated with a second message group context; and performing, using the first MGID, statistics collection associated with the first message group context.

The subject matter described herein may be implemented in hardware, software, firmware, or any combination thereof. As such, the terms "function", "node", or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 2 is a diagram illustrating example test message group contexts;

DETAILED DESCRIPTION

Figure 1:
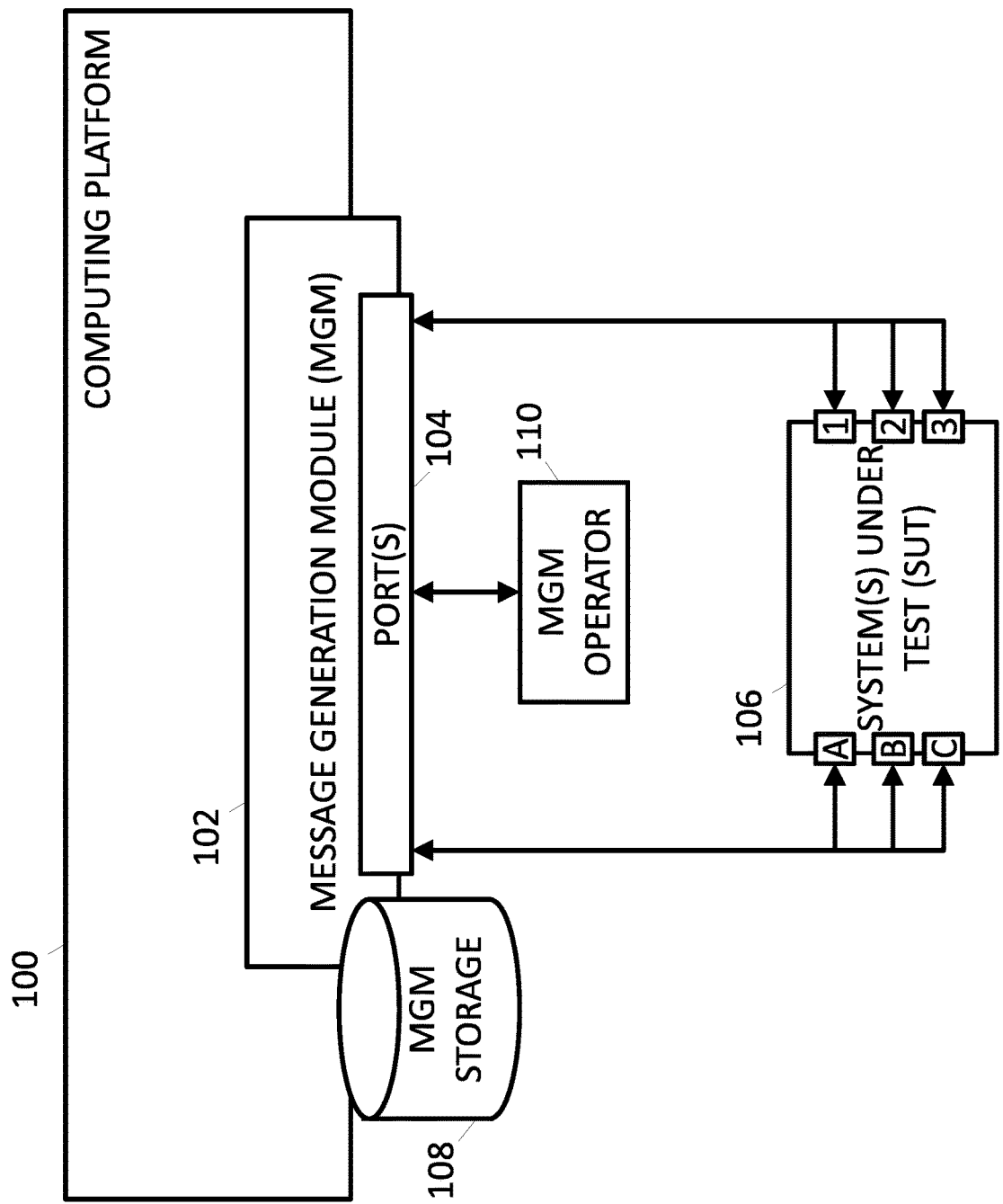
FIG. 1 is a diagram illustrating an example computing platform for network traffic statistics collection.

The subject matter described herein relates to methods, systems, and computer readable media for network traffic statistics collection. When testing one or more computing or networking resources, it may be desirable to test the resources under non-trivial load conditions that mirror or closely approximate real world scenarios. Test systems may generate test messages that are sent to a device or system under test (SUT) and returned by the SUT. As used herein, a test message may refer to various data units, such as a packet, a frame, a datagram, a user datagram protocol (UDP) packet, a transport control protocol (TCP) packet, or, more generally, a protocol data unit (PDU). Such test systems may include tag information in each test message such that the test systems can identify the test messages. Example tag information may include a flow identifier (FLID) and/or a message group identifier (MGID). Based on preconfigured information and/or route discovery messages, test systems may be aware of which ports (e.g., an ingress port and an egress port) associated with a SUT that each test message will or should traverse on its way back to the test system.

Conventional test systems track messages and generate message related metric information for a test by using a memory module or related data structure which includes an entry or record for each unique MGID that is being used in the test. Memory requirements for such a test system are therefore directly proportional to the number of MGIDs (e.g., flows or related messages) associated with a given test scenario. As such, conventional test systems require significant memory resources and significant hardware resources for handling test scenarios with a substantial number of flows or sessions. For example, test system may include transmit ports (e.g., one or more processors and/or network interface cards) for sending test traffic and receive ports (e.g., one or more processors and/or network interface cards) for receiving test traffic. In this example, each receive port may be configured for extracting data from test traffic and performing relevant network traffic statistics collection.

One issue that can occur with test systems is that receive ports may have enough memory and/or processing resources to track and/or generate statistics for one classification context, referred to hereinafter as a message group context, at a time. For example, a message group context may be based on a context tuple of one or more message header parameters. In this example, test messages are assigned a same MGID when the test messages have the same values for the set or tuple of one or more message header parameters indicated by the message group context and test messages are assigned a different MGID when the test messages have different values for the set or tuple of one or more message header parameters indicated by the message group context. In test systems with limited resources, a test operator may be able to specify only a single message group context corresponding to a single context tuple (e.g., source Internet protocol (IP) address, destination IP address, and multiprotocol label switching (MPLS) label value). For example, in a test system with limited resources, test messages may be generated, where an MGID associated with the single message group context may be inserted in each of the test messages prior to transmission from a transmit port of the test system to the SUT. In this example, a receive port of the test system may receive the test message from the SUT, extract the MGID, and update traffic statistics (e.g., message counts, latency statistics, and sequence errors). As used herein, the term "context tuple" may refer to a group or set of message parameters and may be ordered or unordered.

Another issue that can occur in a test system with limited resources is test system reconfigurations and related test restarts resulting in inefficiency and longer testing periods. For example, during testing by a test system capable of monitoring a single message group context, if a test operator wants to view traffic statistics associated with a new message group context corresponding to a different context tuple (e.g., [quality of service (QOS) value, source media access control (MAC) address]), then the test operator may be required to stop the current test, define the new message group context and/or its related context tuple to the test system, and then restart the test so that the test system generates and/or uses test messages that include new tuple related values along with the corresponding MGIDs. While stopping and restarting a test when a new message group context is to be monitored allows for various aspects of a SUT to be tested, this process is inefficient and time consuming for the test operator.

In accordance with some aspects of the subject matter described herein, a computing platform (e.g., a testing platform, a device, or a node) or a module (e.g., a field-programmable gateway array (FPGA), an application-specific integrated circuit (ASIC), or software executing on a processor) may be configured to generate and/or use test messages that include multiple, context-specific MGIDs. For example, an example computing platform (e.g., test system) may generate or use one or more test messages (e.g., packets) containing one or more MGID parameters (e.g., message header parameters or message payload parameters) for storing MGID(s), where each MGID parameter includes an MGID (e.g., packet group identifier (PGID)) associated with a different message group context. In this example, a test message may include a source IP address '1.1.1.1', a destination IP address '2.2.2.2', a MPLS label value '20', a QoS value '1', and a source MAC address '234545435345'. Continuing with this example, assuming a first message group context includes a context tuple of [source IP address, destination IP address, and MPLS label value], a first MGID message group context parameter of the test message may include an MGID '101' and, assuming a second message group context includes a context tuple of [QoS value, source MAC address], a second MGID message group context parameter of the test message may include an MGID '106'.

In accordance with some aspects of the subject matter described herein, a computing platform or module may be configured to switch or change an active message group context during testing by utilizing test messages containing multiple, context-specific MGIDs when switching an active message group context during testing. For example, a test operator may define multiple message group contexts prior to starting of a test. In this example, a test system may generate and transmit test messages, where each transmitted test message includes a separate MGID for each defined message group context. Continuing with this example, e.g., prior to and/or during testing, the test operator may select or designate one of the many defined message group contexts as the active message group context. During testing, test messages may be transmitted to or towards a SUT and eventually be received back at one or more receive ports associated with the test system. The receive ports may be capable of collecting, generating, updating and/or reporting traffic statistics associated with the current active context. At some point during the test, the test operator or the test system (e.g., if the test system is preconfigured to do so) may select or designate a different message group context as the active message group context. In response to changing the active message group context, the receive ports may be notified of the new active message group context and, after being notified, the receive ports may clear or reset their traffic statistics and may begin generating, updating, collecting, and/or reporting traffic statistics for the new active message group context.

Advantageously, in accordance with some aspects of the subject matter described herein, a computing platform or module can use test messages containing multiple context-specific MGIDs when performing network traffic statistics collection. For example, by using test messages containing multiple context-specific MGIDs, a test system or related transmit ports thereof may change the active message group context used for network traffic statistics collection without significantly interrupting or stopping testing (e.g., test message transmission. In this example, after changing the active message group context to a new active message group context, the test system or related receive ports may read, obtain, or extract an MGID associated with the new active message group context from each received test message, e.g., because multiple message group contexts are defined and multiple context-specific MGIDs are inserted into each test message prior to testing.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example computing platform 100 for network traffic statistics collection. Computing platform 100 may represent any suitable entity or entities (e.g., one or more testing platforms, nodes, or devices) associated with sending or receiving traffic (e.g., one or more data units). For example, computing platform 100 may generate and send test traffic to one or more system(s) under test (SUT) 106. In this example, computing platform 100 may receive the test traffic or related traffic from SUT 106 and analyze one or more performance aspects associated with SUT 106.

In some embodiments, computing platform 100 may be a stand-alone tool, a testing device, a test system, or software executing on at least one processor. In some embodiments, computing platform 100 may be a single node or may be distributed across multiple computing platforms or nodes.

In some embodiments, computing platform 100 may include one or more modules for performing various functions. For example, computing platform 100 may include a network node emulation module for emulating a node or device that communicates with SUT 106.

Computing platform 100 may include a message generation module (MGM) 102. MGM 102 may be any suitable entity or entities (e.g., software executing on a processor, an ASIC, an FPGA, or a combination of software, an ASIC, or an FPGA) for performing one or more aspects associated with processing (e.g., receiving, generating, sorting, analyzing, and/or sending) test messages (e.g., packets, frames, and/or other data units). For example, MGM 102 may be configured to generate test messages for a number of emulated flows, sessions, or message group contexts. In this example, each test message may include various data (e.g., header information and payload information) including two or more MGIDs, where each MGID is associated with a different message group context.

In some embodiments, MGM 102 may include one or more ports 104. Ports 104 may be for interacting with users and/or nodes and may include or utilize any suitable entity or entities (e.g., one or more network interface cards (NICs), physical processors, and/or other hardware) for sending or receiving communications. For example, MGM 102 may use one or more multiple ports 104 (e.g., communications interfaces) for receiving and sending various types of data units; such as IP messages, Ethernet frames, Ethernet messages, PDUs, datagrams, UDP messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, MGM 102 may provide one or more communications interfaces and/or ports 104 for communicating with MGM operator 110. MGM operator 110 may be any entity (e.g., an automated system or a device or system controlled or controllable by a human user) for selecting and/or configuring various aspects associated with storing message related data and/or generating network traffic statistics. For example, various user interfaces (e.g., an application user interface (API) and a graphical user interface (GUI)) may be provided for providing configuration information, such as a time out period for assuming message loss, types of metrics to be generated, frequency of metric generation, a number of messages to be generated, a number of message group contexts and related tuples to be used, and/or a number of MGIDs to generate based on the provided message group contexts for each test message in a test. Example user interfaces for testing SUT 106 and/or for providing configuration information may support automation (e.g., via one or more scripting languages), a representation state transfer (REST) API, a command line, and/or a web based GUI.

In some embodiments, MGM 102 may provide one or more communications interfaces and/or ports 104 for interacting with SUT 106. For example, MGM 102 or another entity may be configured to send test messages to SUT 106 via one or more of ports 104 and to receive test messages to SUT 106 via one or more of ports 104. In some embodiments, each of ports 104 may include or access MGM storage 108 and/or local memory. In some embodiments, after receiving test messages or related messages from SUT 106, one or more of ports 104 may be configured to perform network traffic statistics collection for an active message group context. In such embodiments, ports 104 may be configured to perform various actions, such as clear old statistics and start generating/updating new statistics, when an active message group context changes during a test SUT 106 may be any suitable entity or entities (e.g., devices, systems, or platforms) for communicating with computing platform 100 and/or receiving, processing, forwarding and/or sending one or more test messages. For example, SUT 106 may include a network router, a network switch, a network device, a server, or a network controller. In another example, SUT 106 may include one or more systems and/or computing platforms, e.g., a data center or a group of servers and/or routers. In yet another example, SUT 106 may include one or more networks or related components, e.g., an access network, a core network, or the Internet.

In some embodiments, MGM 102 may include functionality for allowing a test operator or another entity to define multiple message group contexts for use in testing SUT 106. For example, a test operator may define a first message group context for a test involving SUT 106, where defining the first message group context may include defining or identifying a first context tuple of message parameters, e.g., [source IP address, destination IP address, source MAC address]. In this example, the test operator may also define a second message group context for the test, where defining the second message group context may include defining or identifying a second context tuple of message parameters, e.g., [QoS value, source MAC address].

In some embodiments, MGM 102 or another entity may include functionality for generating message information associated with defined message group contexts. For example, MGM 102 may generate message content (e.g., header and/or payload data) based on one or more defined message group contexts and/or its related message parameters. In this example, MGM 102 may generate message content so as to provide or generate multiple MGIDs per message group context for a given test or test sequence thereof.

In some embodiments, e.g., prior to testing and/or transmitting test messages to SUT 106, MGM 102 or another entity may generate or assign MGIDs based on sets or tuples of message parameters values and message group contexts in test messages. For example, assuming a test includes a defined first message group context indicating a first context tuple of message parameters (e.g., [X, Y, Z]), and for a given test message, MGM 102 or another entity may assign a first context-specific MGID (e.g., MGID '33') to a unique set of message parameter values (e.g., [X=34, Y=78, Z=170]) in the test message, where the message parameter values are associated with the first tuple message parameters associated with the first message group context. In this example, for the same test message and assuming the test also includes a defined second message group context indicating a second context tuple of message parameters (e.g., [A, B]), MGM 102 or another entity may assign a second context-specific MGID (e.g., MGID '23') to a unique set of message parameter values (e.g., [A=143, B=45]) in the test message, where the message parameter values are associated with the second tuple message parameters associated with the second message group context.

In some embodiments, e.g., prior to testing and/or transmitting test messages to SUT 106, MGM 102 may include functionality for generating test messages. For example, MGM 102 may generate a plurality of test messages using generated message content based on defined message group contexts and/or other test configuration information. In this example, when generating the plurality of test messages, MGM 102 may include or insert one or more corresponding context-specific MGIDs prior to transmitting the test messages to or towards SUT 106.

In some embodiments, MGM 102 may include functionality for storing message related data prior to, during, and/or after testing SUT 106. For example, prior to sending a test message containing multiple context-specific MGIDs, MGM 102 may be configured to store information (e.g., the MGIDs and various message parameter values) related to the test messages in a data structure that indexes such information using MGIDs, related message group contexts, and/or other data, e.g., at MGM storage 108. In this example, MGM 102 may store this information and/or update existing information in the data structure, e.g., after the test messages are sent to SUT 106 and received back from SUT 106.

In some embodiments, MGM 102 may store some or all MGIDs in flight (e.g., all MGIDs for every in message group content in test messages sent to SUT 106) in one or more data structures. For example, message related information may be stored in ingress (e.g., receive) data structure and/or an egress (e.g., send) data structure. In this example, the egress data structure may store, for each active message group context being tested, an MGID and/or other information associated with the most recently sent (e.g., to SUT 106) test message. Continuing with this example, the ingress data structure may store, for each active message group context being tested, an MGID associated with the last received (e.g., from SUT 106) test message and/or may store a highest MGID associated with an active message group context observed. In another example, MGM 102 may be configured to perform sequence checking using an ingress data structure and information in the test messages. In this example, an egress data structure may not be maintained.

In some embodiments, MGM 102 may include functionality for waiting for responses (e.g., test messages and/or other messages) from SUT 106. For example, after sending a test message and storing information about the test message, MGM 102 or another entity may be configured to wait for the test message or related information to be received from SUT 106. In this example, MGM 102 or another entity may use a timer or another technique for determining how long to wait before assuming that the test message was lost or misrouted. If an error message is received and/or after a certain amount of time has elapsed, MGM 102 or another entity may perform one or more actions, such as generating a message related metric and/or updating a relevant data structure entry.

In some embodiments, MGM 102 may include functionality for analyzing responses received from SUT 106. For example, MGM 102 may be configured to receive a test message from SUT 106 and may determine whether the test message is expected, unexpected, corrupted, and/or out of order. In another example, MGM 102 may be configured to receive an error message from SUT 106 and may determine which, if any, test message, flow, message group context, and/or MGID is associated with the error message.

In some embodiments, analyzing a test message may include identifying, using an MGID associated with the test message, a data structure entry associated with the test message and/or determining whether information (e.g., an MGID, an MGID sequence number, and/or other data) stored in a relevant data structure entry matches or corresponds to information (e.g., an MGID and/or other data) in the test message. For example, if information in a test message matches or corresponds to information in a relevant data structure entry, various actions may occur, such as generating one or more network traffic statistics associated with a successful message trip and/or updating the relevant data structure entry. In another example, if information in a test message does not match or correspond to information in a relevant data structure entry, various actions may occur, such as generating one or more network traffic statistics associated with an unsuccessful message trip and/or updating the relevant data structure entry.

In some embodiments, determining whether information (e.g., an MGID, an MGID sequence number, and/or other data) stored in a relevant data structure entry matches or corresponds to information (e.g., an MGID and/or other data) in the test message may include determining whether the test message is the next expected message in a sequence for a given MGID. For example, if an ingress data structure for message group context '3' indicates that the last received MGID sequence number is '123', MGM 102 may determine whether a newly received test message includes an MGID sequence number associated with message group context '3' with an expected value of '124'. In this example, if the test message includes the expected MGID sequence number, MGM 102 may determine that the test message is the next expected message and perform actions accordingly, e.g., update a message count metric. However, if the test message does not include the expected MGID, MGM 102 may determine that the test message is not the next expected message and perform actions accordingly, e.g., log that the test message has been lost or misrouted.

In some embodiments, MGM 102 may include functionality for generating one or more network traffic statistics. Example network traffic statistics that can be generated may include a message loss metric, a message delay metric, a jitter metric, a message count metric, a message ordering metric, a session related metric, a message group context related metric, or a SUT related metric. For example, after analyzing a received test message associated with an MGID '231' involving an active message group context, a message count metric associated with MGID '231' may be incremented. In another example, after analyzing an error message and/or determining that a test message an MGID '75' involving an active message group context was lost, a message loss metric associated with MGID 75' may be incremented.

In some embodiments, MGM 102 or another entity may include functionality for reporting or providing network traffic statistics. In some examples, MGM 102 may be configured to provide statistics via one or more communications interfaces, e.g., a GUI or an API. In some examples, MGM 102 or another entity may convert, analyze, or utilize collected network traffic statistics to generate reports, graphs, or visualizations to a test operator or other entity.

In some embodiments, MGM 102 may include functionality for accessing MGM storage 108. MGM storage 108 may be any suitable entity or entities (e.g., a storage device, a non-transitory computer readable medium, or a storage system) for maintaining or storing information related to messages and/or related metrics. For example, MGM storage 108 may contain information usable for generating metrics (e.g., statistics) associated with one or more performance aspects of SUT 106. Example message related data may include an MGID, payload information, header information, and/or other related information. In this example, MGM storage 108 may also contain metrics associated with one or more performance aspects of SUT 106 during one or more tests. For example, using configuration information regarding testing, MGM storage 108 may maintain a particular set of computed metrics for a first test and may maintain another set of computed metrics for a second test. In some embodiments, MGM storage 108 may be located at computing platform 100, another node, or distributed across multiple platforms or devices.

It will be appreciated that FIG. 1 is for illustrative purposes and that various nodes and/or modules, locations, and/or functionality described above in relation to FIG. 1 may be changed, altered, added, or removed.

FIG. 2 is a diagram illustrating example message related data 200 (e.g., data associated with generating test messages and network traffic statistics collection). In some embodiments, message related data 200 may be accessed and/or stored by computing platform 100 and/or MGM 102 using various data structures. In some embodiments, message related data 200 may include any suitable information, such message content, message group context definition information, or other message related data, for testing and/or measuring performance aspects associated with SUT 106.

In some embodiments, an MGID may include any suitable identifier, such as a session identifier or a group or tuple of message header values, usable for identifying one or more related messages. For example, an message group context may include a 5-tuple including (1) source address(es), (2) destination address(es), (3) source port number(s), (4) destination port number(s), and (5) application protocol(s) (e.g., TCP, UDP, etc.). In this example, an MGID associated with the message group context for a given test message may be a concatenation of all five values of the 5-tuple in the test message or a value based on the five values of the 5-tuple. In another example, an MGID may include a single value, such as a session identifier or a sequence number used by one or more protocols or entities.

Referring to FIG. 2, message related data 200 may be depicted using a table representing associations between message group contexts, MGIDs, and related data in test messages. In some embodiments, message related data 200 may be stored or maintained in MGM storage 208 and may be usable for generating, verifying, or analyzing test messages or test scenarios.

As depicted in FIG. 2, each row represents a test message that is associated with multiple message group contexts, e.g., a context '1', a context '2', and a context '3'. Each message group context may be associated with a context tuple of one or more message parameters. For example, context '1' is associated with a destination IP address parameter, context '2' is associated with a source IP address parameter, and context '3' is associated with an application identifier (ID) parameter and a QoS value parameter. Each MGID may indicate a unique set of message parameter values associated with a corresponding message group context. Test message '1' (row 1) may include an MGID '1' associated with context '1', where the MGID is based on a destination IP address 'IP1'; an MGID '1' associated with context '2', where the MGID is based on a source IP address 'IP3'; and an MGID '1' associated with context '3', where the MGID is based on an application ID '24' and a QoS value '1'. Test message '2' (row 2) may include an MGID '1' associated with context '1', where the MGID is based on a destination IP address 'IP1'; an MGID '2' associated with context '2', where the MGID is based on a source IP address 'IP4'; and an MGID '2' associated with context '3', where the MGID is based on an application ID '24' and a QoS value '2'. Test message '3' (row 3) may include an MGID '2' associated with context '1', where the MGID is based on a destination IP address 'IP2'; an MGID '1' associated with context '2', where the MGID is based on a source IP address 'IP3'; and an MGID '3' associated with context '3', where the MGID is based on an application ID '8' and a QoS value '1'. Test message '4' (row 4) may include an MGID '2' associated with context '1', where the MGID is based on a destination IP address 'IP2'; an MGID '2' associated with context '2', where the MGID is based on a source IP address 'IP4'; and an MGID '1' associated with context '3', where the MGID is based on an application ID '8' and a QoS value '2'.

In some embodiments, a message identifier may be used as a key or index value into a data structure for storing message related data 200 in MGM storage 208. For example, a message identifier (e.g., a generation or transmit timestamp) may be a unique identifier (e.g., a test sequence number) for identifying a test message in a test and may be separate from any MGIDs stored in the test message. In another example, a message identifier may be a combination of various test message data, e.g., one or more MGIDs and a transmit timestamp.

In some embodiments, MGIDs and/or related data structure entries may be defined prior to, subsequent to, or concurrent with a test period. For example, MGM 102 and/or another entity may use defined message group contexts and/or a test operator's preferences to identify one or more message group contexts that are usable during a test. In this example, a related data structure may include data entries for message contents associated with each defined message group context, where each data entry may include default parameter values (e.g., blank, null, or 0) for various test messages.

It will be appreciated that message related data 200 in FIG. 2 is for illustrative purposes and that different and/or additional information may also be stored or maintained. For example, message related data 200 may also include timestamps (e.g., time of transmission to SUT 106) associated with test messages, such timestamps may be used as message identifiers and/or used in generating delay metrics and/or may be used to set timers for assuming message loss. In another example, each test message may also include message group context-specific sequence numbers. In this example, each test message depicted in FIG. 2 may include a sequence number for each of the MGIDs and/or message group contexts associated with the test message.

Further, it will be appreciated that message related data 200 may be stored in various data structures, memories, media, and/or in one or more locations. For example, MGM 102 may maintain an ingress data structure for storing information about messages being received from SUT 106 and an egress data structure for storing information about messages being sent to SUT 106. In another example, message contents (e.g., message parameter values) for test messages may be stored in a data structure separate from MGIDs or other related information.

Figure 3:
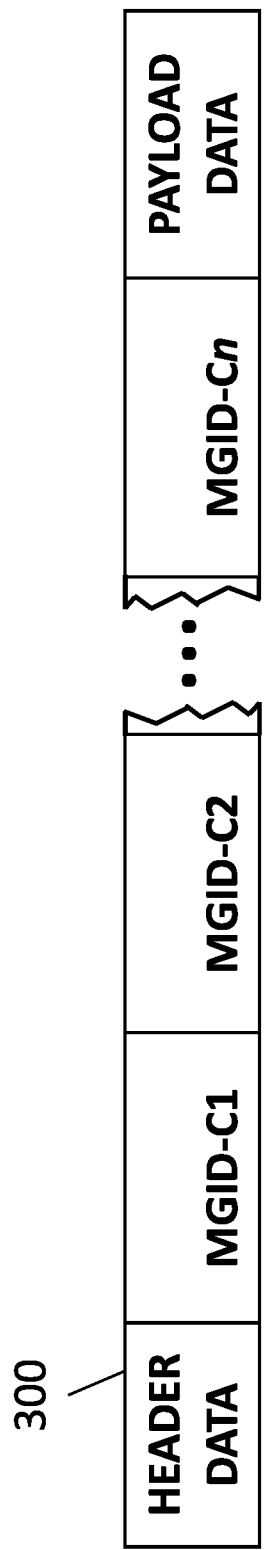
FIG. 3 is a diagram illustrating example test message data associated with network traffic statistics collection.

FIG. 3 is a diagram illustrating an example test message 300. Test message 300 may be one of multiple test messages generated for testing SUT 106. For example, MGM 102 or another entity may generate numerous test messages for testing various aspects of SUT 106 based on a test operator's configuration information and/or other data (e.g., predefined information and/or system defaults).

Referring to FIG. 3, test message 300 may include multiple data portions, including header data, payload data, and multiple MGIDs associated with different message group contexts. For example, a test message may include multiple MGID parameters, e.g., message header fields, message payload fields, attribute value pairs (AVPs), or tag-length-values (TLVs), for storing context-specific MGIDs. In some embodiments, an MGID or a related MGID sequence number may be an explicit field or parameter value in a message (e.g., packet) or may be information that is directly or indirectly derived from other fields already present in the message. For example, a single parameter may be used to store all context-specific MGIDs, where the order of the contexts is predefined or determinable to MGM 102 and/or other entities (e.g., ports 104).

As depicted in FIG. 3, for a given number n of MGIDs, test message 300 may include an MGID for a first message group context (e.g., MGID-C1), an MGID for a second message group context (MGID-C2), and so on and so forth until an MGID for an nth message group context (MGID-Cn). In some embodiments, each message group context may indicate or define a context tuple of message parameters, where same values for the context tuple of message parameters is usable for identifying test messages as belonging to the same message group or flow. Continuing with this example, an MGID associated with the first message group context may indicate a unique set of message parameter values associated with the first message group context and an MGID associated with the second message group context may indicate a unique set of message parameter values associated with the second message group context.

In some embodiments, each MGID may be stored in test message 300 in such a way that computing platform 100, MGM 102, port(s) 104, or another entity can obtain, extract, or otherwise determine an appropriate MGID for an active message group context. For example, MGM 102 or another entity may provide to receive ports 104 (e.g., via a trigger message or other communication) message byte offset information or other information for a test or test message therein. In this example, the message byte offset information or other information may usable to read a context-specific MGID in test message 300. In another example, the order and/or location of MGIDs associated with one or more message group contexts in test message 300 may be known or predetermined. In another example, each parameter storing an MGID and/or each MGID may be self-identifying. In this example, a numbering or labeling scheme for MGIDs may indicate a related message group context identifier, e.g., an MGID '34-C1' for test message 300 may indicate a message group context 'C1', whereas a second MGID '23-C2' for test message 300 may indicate a message group context 'C2'.

It will be appreciated that test message 300 in FIG. 3 is for illustrative purposes and that different and/or additional information may be in test message 300 for testing SUT 106. For example, test message 300 may also include timestamps (e.g., time of transmission to SUT 106) associated with transmission or generation of test messages, such timestamps may be used in generating delay metrics and/or may be used to set timers for assuming message loss.

FIGS. 4A-4D are diagrams illustrating example network traffic statistics collection using message group contexts. In some embodiments, MGM 102 may be configured to generate messages for testing one or more performance aspects associated with SUT 106. In some embodiments, MGM 102 and/or MGM storage 108 may maintain message related data associated with testing SUT 106.

In some embodiments, test messages or test message data therein may be pre-generated, e.g., prior to testing SUT 106. For example, MGM 102 may generate, using various test configurations and/or user preferences, a group of test messages containing multiple MGIDs associated with multiple message group contexts. In this example, the group of test messages may be stored and copies of the test messages may be generated and transmitted to SUT 106 for the duration of the test, e.g., the test may involve a sequence of test messages being sent multiple times or until the test is canceled (e.g., by MGM operator 110).

In some embodiments, prior to starting a test, MGM 102 may utilize test message containing multiple MGIDs for multiple message group contexts so as to quickly and efficiently change an active message group context during testing of SUT 106, e.g., without substantially stopping testing (e.g., stoppage, if any, being between a zero seconds to one minute). For example, MGM 102 or another entity (e.g., MGM operator 110) may start a test where a group of test messages containing multiple MGIDs associated with multiple message group contexts are sent repeatedly to SUT 106 and, at various times, MGM 102 or another entity (e.g., MGM operator 110) may trigger the test system to change an active message group context such that the test system clears old network traffic statistics and starts collecting network traffic statistics using MGIDs in the test messages that are associated with the new active message group context.

Figure 4A:
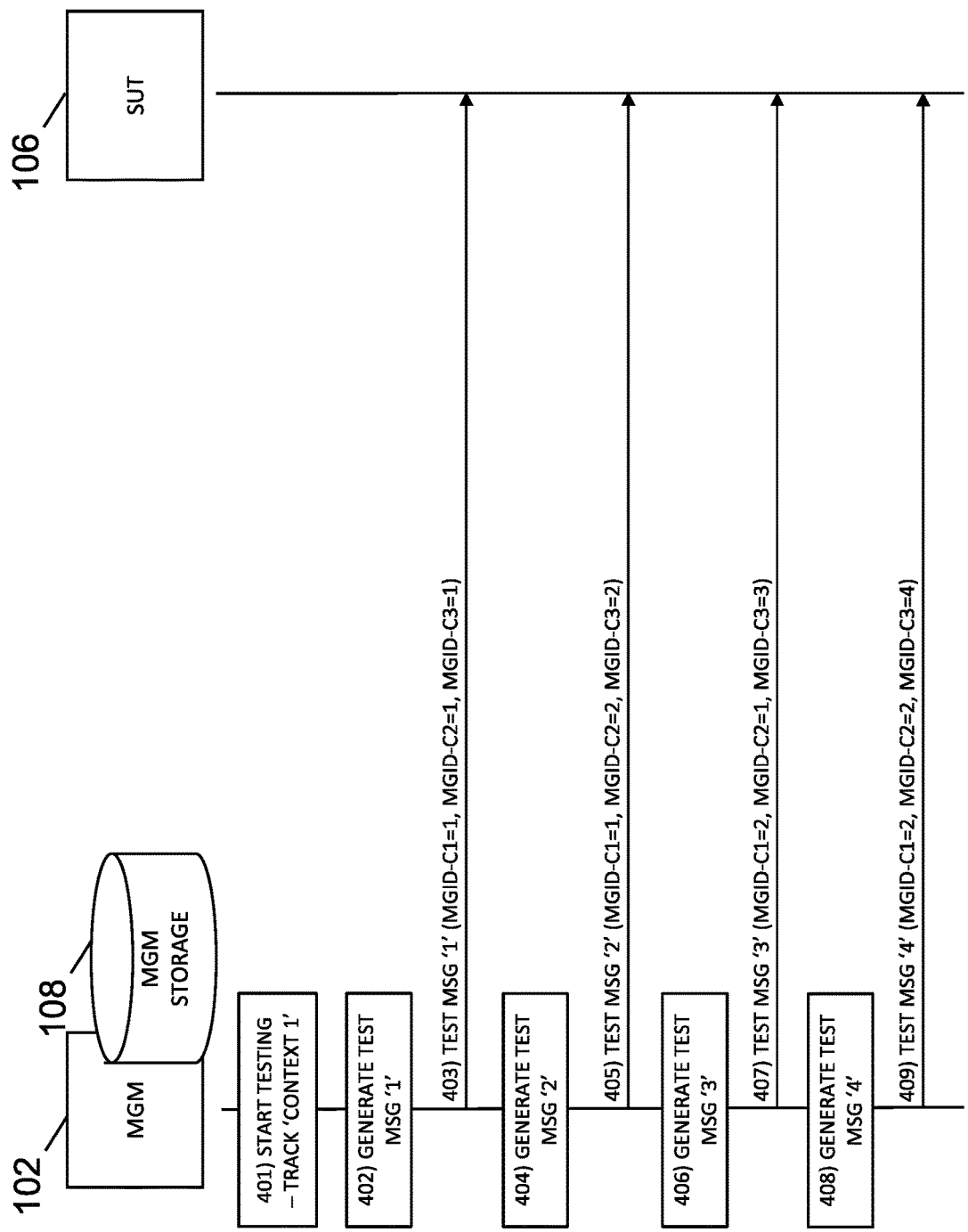
FIGS. 4A-4D are diagrams illustrating example network traffic statistics collection using message group contexts.

Referring to FIG. 4A, in step 401, MGM 102 or another entity may start testing SUT 106, where an initial active message group context is 'Context 1'.

In step 402, MGM 102 may generate (or retrieve from storage) test message '1' containing multiple MGIDs, each MGID associated with a different message group context. For example, test message '1' may include an MGID for 'Context 1' (MGID-C1) '1', an MGID for 'Context 2' (MGID-C2) '1', and an MGID for 'Context 3' (MGID-C3) '1'.

In step 403, test message '1' may be sent to SUT 106. For example, MGM 102 or another entity may send test message '1' and SUT 106 may receive the test message and process (e.g., forward) the test message.

In step 404, MGM 102 may generate (or retrieve from storage) test message '2' containing multiple MGIDs, where each MGID is associated with a different message group context. For example, test message '2' may include an MGID-C1 '1', an MGID-C2 '2', and an MGID-C3 '2'.

In step 405, test message '2' may be sent to SUT 106. For example, MGM 102 or another entity may send test message '2' and SUT 106 may receive the test message and process (e.g., forward) the test message.

In step 406, MGM 102 may generate (or retrieve from storage) test message '3' containing multiple MGIDs, where each MGID is associated with a different message group context. For example, test message '3' may include an MGID-C1 '2', an MGID-C2 '1', and an MGID-C3 of '3'.

In step 407, test message '3' may be sent to SUT 106. For example, MGM 102 or another entity may send test message '3' and SUT 106 may receive the test message and process (e.g., forward) the test message. In step 408, MGM 102 may generate (or retrieve from storage) test message '4' containing multiple MGIDs, where each MGID is associated with a different message group context. For example, test message '4' may include an MGID-C1 '2', an MGID-C2 '2', and an MGID-C3 '4'.

In step 409, test message '4' may be sent to SUT 106. For example, MGM 102 or another entity may send test message '4' and SUT 106 may receive the test message and process (e.g., forward) the test message.

Figure 4B:
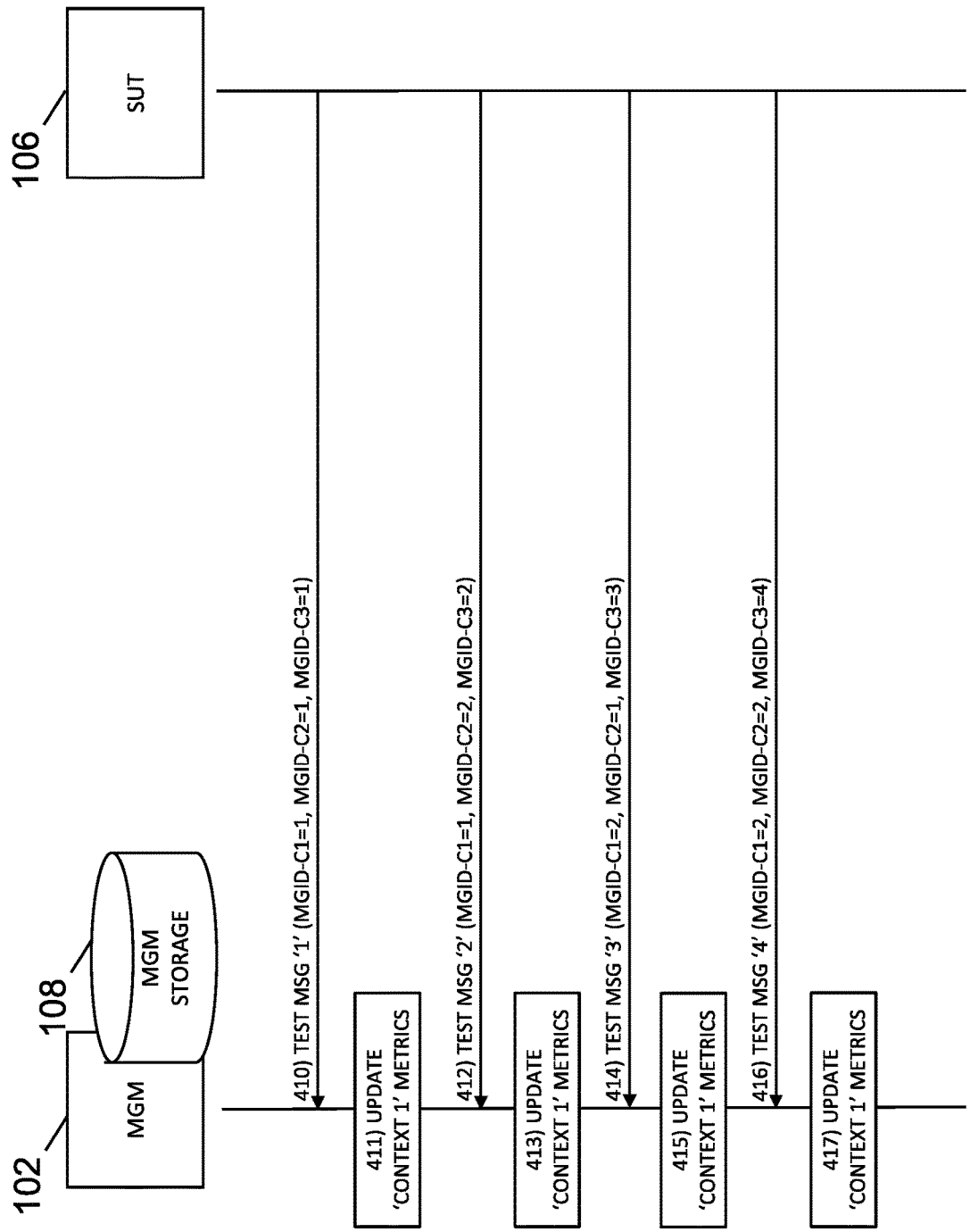

Referring to FIG. 4B, in step 410, test message '1' may be sent from SUT 106 to MGM 102 or another entity (e.g., computing platform 100).

In step 411, one or more network traffic statistics may be generated and/or updated. For example, MGM 102 may obtain the MGID associated with 'Context 1' (e.g., the MGID-C1 value) in test message '1' and generate and/or update network traffic related metrics. In this example, if the information in the received test message (e.g., the MGID-C1 value) matches or corresponds to expected information in a relevant data structure entry (e.g., stored in MGM storage 108 or in memory at or associated with a receive port processor at computing platform 100), a message count metric may be incremented and/or another metric may be generated. Continuing with this example, if the information in the received test message does not match or correspond to expected information in the relevant data structure entry, a message loss metric may be incremented and/or an error related metric may be generated.

In some embodiments, MGM 102 may store message related data associated with messages received from SUT 106, e.g., in an ingress data structure. For example, MGM 102 may maintain an ingress data structure that contains an MGID and/or MGID sequence number from a previously received test message for one or more message group contexts being tested. In this example, analyzing a test message may include determining, using an MGID and/or MGID sequence number stored in a relevant ingress data structure entry and an MGID and/or MGID sequence number in a most recently received test message, whether the most recently received test message is the next expected message in a sequence.

In step 412, test message '2' may be sent from SUT 106 to MGM 102 or another entity (e.g., computing platform 100).

In step 413, one or more network traffic statistics may be generated and/or updated. For example, MGM 102 may obtain the MGID associated with 'Context 1' (e.g., the MGID-C1 value) in test message '2' and generate and/or update network traffic related metrics.

In step 414, test message '3' may be sent from SUT 106 to MGM 102 or another entity (e.g., computing platform 100).

In step 415, one or more network traffic statistics may be generated and/or updated. For example, MGM 102 may obtain the MGID associated with 'Context 1' (e.g., the MGID-C1 value) in test message '3' and generate and/or update network traffic related metrics.

In step 416, test message '4' may be sent from SUT 106 to MGM 102 or another entity (e.g., computing platform 100).

In step 417, one or more network traffic statistics may be generated and/or updated. For example, MGM 102 may obtain the MGID associated with 'Context 1' (e.g., the MGID-C1 value) in test message '4' and generate and/or update network traffic related metrics.

Figure 4C:
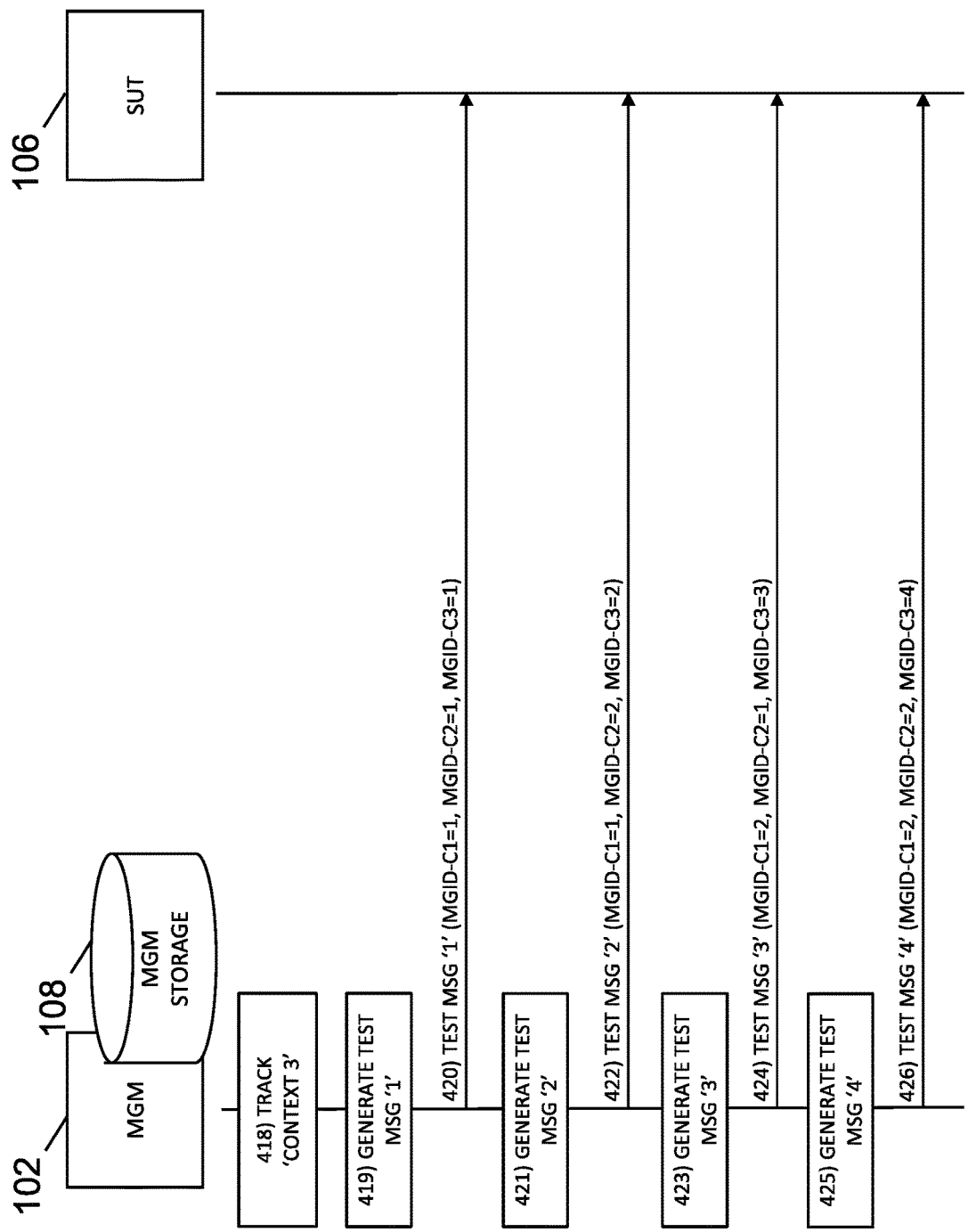

Referring to FIG. 4C, in step 418, a trigger message may indicate that the active message group context is 'Context 3'. In some embodiments, a trigger message may include one or more communications or data units for indicating or trigger a change in the active message group context used for statistics collection during a test. For example, a trigger message may be sent internally within a test system and/or may use proprietary or non-standard protocols, e.g., a trigger message may traverse an "internal" communications bus or switching fabric connecting computing platform 100, MGM 102, and ports 104. In another example, a trigger message may be sent externally to a test system and/or may use IP, Ethernet and/or other standard protocols, e.g., a trigger message may travel via an IP communications network connecting computing platform 100, MGM 102, and ports 104

In some embodiments, trigger messages may be initiated based on user interaction with computing platform 100, MGM 102 or a related entity. For example, a test operator may use a GUI or other user interface to change the active message group context of an on-going (e.g., active or current) test session involving SUT 106 from one message group context to another message group context.

In some embodiments, trigger messages may be initiated based on pre-configured information. In another example, the trigger message may be generated based on test configuration information, e.g., preconfigured test commands to change an active message group context after five minutes of testing or after a test message sequence has been transmitted and received.

In some embodiments, e.g., after receiving a trigger message for changing an active message group context, an MGM 102 and/or related entities may perform various actions. Example actions performed may including saving network traffic statistics associated with a prior active message group context (e.g., MGM storage 108), clearing network traffic statistics associated with a prior active message group context, triggering a test message sequence to resend during the test, and/or generating and/or updating network traffic statistics associated with the (new) active message group context.

In step 419, MGM 102 may generate (or retrieve from storage) test message '1'.

In step 420, test message '1' may be sent to SUT 106. For example, MGM 102 or another entity may send test message '1' and SUT 106 may receive the test message and process (e.g., forward) the test message.

In step 421, MGM 102 may generate (or retrieve from storage) test message '2'.

In step 422, test message '2' may be sent to SUT 106. For example, MGM 102 or another entity may send test message '2' and SUT 106 may receive the test message and process (e.g., forward) the test message.

In step 423, MGM 102 may generate (or retrieve from storage) test message '3'.

In step 424, test message '3' may be sent to SUT 106. For example, MGM 102 or another entity may send test message '3' and SUT 106 may receive the test message and process (e.g., forward) the test message.

In step 425, MGM 102 may generate (or retrieve from storage) test message '4'.

In step 426, test message '4' may be sent to SUT 106. For example, MGM 102 or another entity may send test message '4' and SUT 106 may receive the test message and process (e.g., forward) the test message.

Figure 4D:
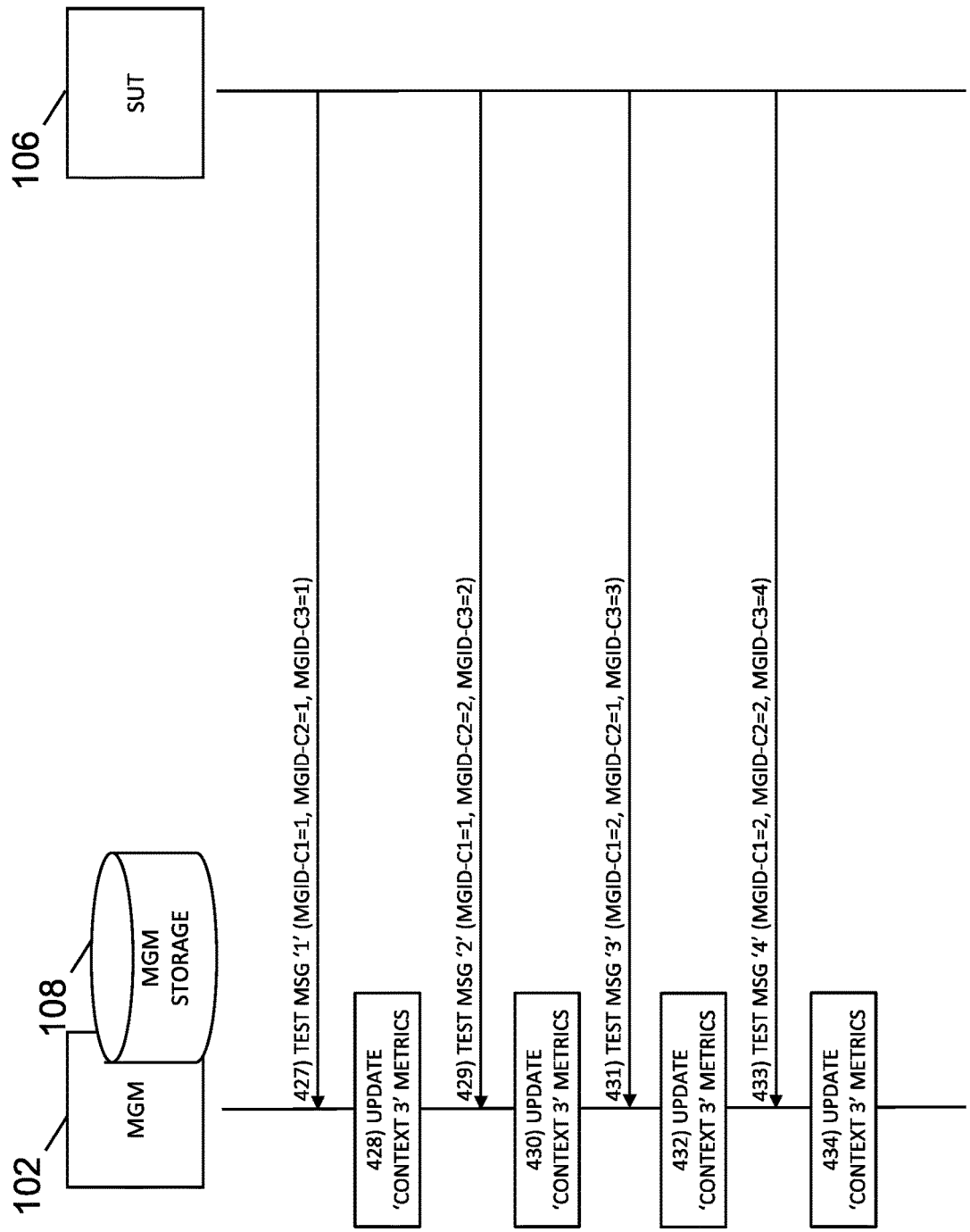

Referring to FIG. 4D, in step 427, test message '1' may be sent from SUT 106 to MGM 102 or another entity (e.g., computing platform 100).

In step 428, one or more network traffic statistics may be generated and/or updated. For example, MGM 102 may obtain the MGID associated with 'Context 3' (e.g., the MGID-C3 value) in test message '1' and generate and/or update network traffic related metrics. In this example, if the information in the received test message (e.g., the MGID-C3 value and/or MGID sequence number) matches or corresponds to expected information in a relevant data structure entry (e.g., stored in MGM storage 108 or in memory at or associated with a receive port processor at computing platform 100), a message count metric may be incremented and/or another metric may be generated. Continuing with this example, if the information in the received test message does not match or correspond to expected information in the relevant data structure entry, a message loss metric may be incremented and/or an error related metric may be generated.

In step 429, test message '2' may be sent from SUT 106 to MGM 102 or another entity (e.g., computing platform 100).

In step 430, one or more network traffic statistics may be generated and/or updated. For example, MGM 102 may obtain the MGID associated with 'Context 3' (e.g., the MGID-C3 value) in test message '2' and generate and/or update network traffic related metrics.

In step 431, test message '3' may be sent from SUT 106 to MGM 102 or another entity (e.g., computing platform 100).

In step 432, one or more network traffic statistics may be generated and/or updated. For example, MGM 102 may obtain the MGID associated with 'Context 3' (e.g., the MGID-C3 value) in test message '3' and generate and/or update network traffic related metrics.

In step 433, test message '4' may be sent from SUT 106 to MGM 102 or another entity (e.g., computing platform 100).

In step 434, one or more network traffic statistics may be generated and/or updated. For example, MGM 102 may obtain the MGID associated with 'Context 3' (e.g., the MGID-C3 value) in test message '4' and generate and/or update network traffic related metrics.

It will be appreciated that FIGS. 4A-4D are for illustrative purposes and that different and/or additional steps other than those depicted in FIGS. 4A-4D may occur. Further, it will be appreciated that some steps may occur in a different order than depicted in FIGS. 4A-4D. For example, some test messages may be sent and received before other test messages are sent.

Figure 5:
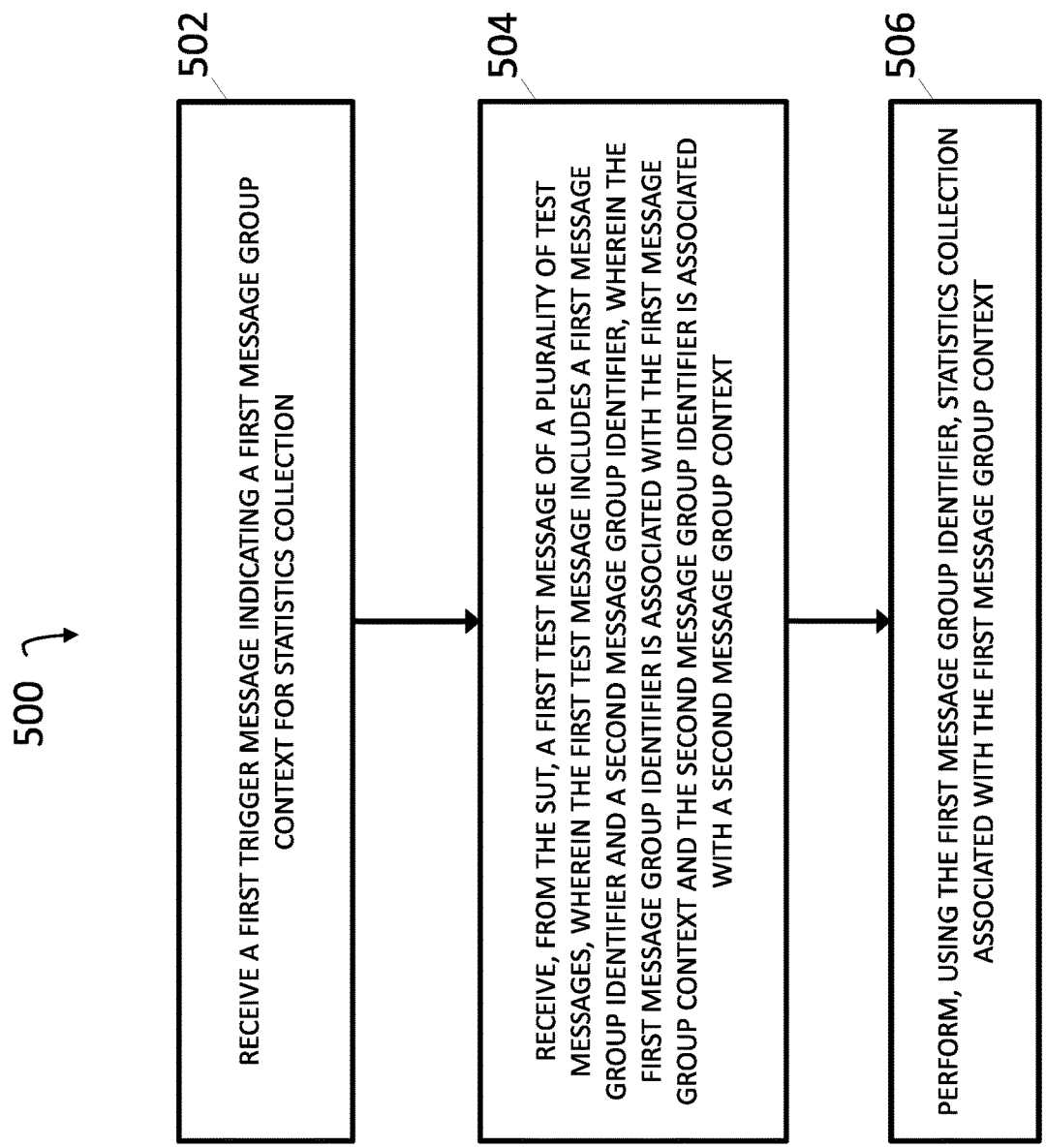
FIG. 5 is a diagram illustrating an example process for network traffic statistics collection.

FIG. 5 is a diagram illustrating an example process for network traffic statistics collection. In some embodiments, example process 500, or portions thereof, may be performed by or at computing platform 100, MGM 102, and/or another node or module. For example, computing platform 100 may include a network equipment test device and/or a testing system for testing one or more performance aspects associated with SUT 106.

In step 502, a first trigger message indicating a first message group context for statistics collection may be received. For example, the first trigger message may be an internal communication (e.g., traversing a communications bus or switching fabric associated with computing platform 100) between MGM 102 ports 104, or other entities. In this example, the first trigger message may be sent or initiated in response to MGM operator 110 interacting with a GUI to change from one message group context to another message group context. In another example, the first trigger message may be one or more data packets sent via the Internet or an IP network connecting MGM 102, ports 104, or other entities. In this example, the first trigger message may be sent or initiated in response to a timer expiring based on preconfigured test configuration information indicating when MGM 102 or another entity should change the active message group context during a test.

In step 504, a first test message of a plurality of test messages may be received from SUT 106. In some embodiments, the first test message may include a first MGID and a second MGID. In some embodiments, the first MGID may be associated with the first message group context and the second MGID may be associated with a second message group context.

In step 506, statistics collection associated with the first message group context may be performed using the first MGID.

In some embodiments (e.g., without stopping the transmission of test messages and/or without determining a new group of test messages), a second trigger message indicating a second message group context for statistics collection may be sent. In some embodiments (e.g., after receiving the second trigger message), a second test message may be received from SUT 106. In some embodiments, the second test message may include a third MGID and a fourth MGID. In some embodiments, the third MGID may be associated with the first message group context and the fourth MGID may be associated with the second message group context. In some embodiments (e.g., after receiving the second test message including a third MGID and a fourth MGID), statistics collection associated with the second message group context may be performed using the fourth MGID.

In some embodiments, a first message group context may indicate a first group of one or more message parameters for monitoring and a second message group context may indicate a second group of one or more message parameters for monitoring. In some embodiments, the second group may include at least one message parameter different from the one or more message parameters in the first group.

In some embodiments, a first MGID indicates a first unique set of message parameter values of a first group (e.g., a first context tuple) of one or more message parameters and a second MGID indicates a first unique set of message parameter values of a second group (e.g., a second context tuple) of one or more message parameters.

In some embodiments, (e.g., prior to testing SUT 106), a plurality of test messages including the first test message may be generated. In some embodiments, each of the plurality of test messages may include a plurality of MGIDs, wherein each of the MGIDs may be associated with a different message group context.

In some embodiments, receiving a first trigger message may include resetting collected statistics associated with a prior message group context group.

In some embodiments, performing, using the first MGID, the statistics collection associated with the first message group context may include obtaining the first MGID from the first test message and updating a message loss metric, a message delay metric, a jitter metric, a message count metric, a message ordering metric, a session related metric, a message group context related metric, or a SUT related metric.

In some embodiments, the SUT may include a network switch, a network router, or a network device.

In some embodiments, the first test message may be received at a receive port processor of a test system and wherein the first test message may be sent from a transmit port processor of the test system.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network traffic statistics collection, the method comprising:
    during testing of a system under test (SUT):
        receiving a first trigger message indicating a first message group context for statistics collection, wherein the first message group context indicates a first group of message parameters for monitoring;
        receiving, from the SUT, a first test message of a plurality of test messages, wherein the first test message includes a first message group identifier (MGID) and a second MGID, wherein the first MGID is associated with the first message group context and the second MGID is associated with a second message group context, wherein each unique MGID associated with a respective message group context indicates a unique group of message parameter values for a respective group of message parameters associated with the respective message group context;
        performing, using the first MGID, statistics collection associated with the first message group context;
        receiving a second trigger message indicating a second message group context for statistics collection;
        receiving, from the SUT, a second test message, wherein the second test message includes a third MGID and a fourth MGID, wherein the third MGID is associated with the first message group context and the fourth MGID is associated with the second message group context; and
        performing, using the fourth MGID, statistics collection associated with the second message group context.

2. The method of claim 1 wherein the second message group context indicates a second group of one or more message parameters for monitoring, wherein the second group includes at least one message parameter different from the message parameters in the first group.

3. The method of claim 1 wherein the second MGID indicates a unique group of message parameter values for the second group of one or more message parameters.

4. The method of claim 1 comprising:
    prior to testing:
        generating a plurality of test messages including the first test message, wherein each of the plurality of test messages includes a plurality of MGIDs, wherein each of the MGIDs is associated with a different message group context.

5. The method of claim 1 wherein receiving a first trigger message includes resetting collected statistics associated with a prior message group context.

6. The method of claim 1 wherein performing, using the first MGID, the statistics collection associated with the first message group context includes obtaining the first MGID from the first test message and updating a message loss metric, a message delay metric, a jitter metric, a message count metric, a message ordering metric, a session related metric, a message group context related metric, or a SUT related metric.

7. The method of claim 1 wherein the SUT includes a network switch, a network router, or a network device.

8. The method of claim 1 wherein the first test message is received at a receive port processor of a test system and wherein the first test message is sent from a transmit port processor of the test system.

9. A system for network traffic statistics collection, the system comprising:
    at least one processor;
    a test system implemented using the at least one processor; the test system configured for:
    during testing of a system under test (SUT):
        receiving a first trigger message indicating a first message group context for statistics collection, wherein the first message group context indicates a first group of message parameters for monitoring;
        receiving, from the SUT, a first test message of a plurality of test messages, wherein the first test message includes a first message group identifier (MGID) and a second MGID, wherein the first MGID is associated with the first message group context and the second MGID is associated with a second message group context, wherein each unique MGID associated with a respective message group context indicates a unique group of message parameter values for a respective group of message parameters associated with the respective message group context;
        performing, using the first MGID, statistics collection associated with the first message group context;
        receiving a second trigger message indicating a second message group context for statistics collection;
        receiving, from the SUT, a second test message, wherein the second test message includes a third MGID and a fourth MGID, wherein the third MGID is associated with the first message group context and the fourth MGID is associated with the second message group context; and
    performing, using the fourth MGID, statistics collection associated with the second message group context.

10. The system of claim 9 wherein the second message group context indicates a second group of message parameters for monitoring, wherein the second group includes at least one message parameter different from the message parameters in the first group.

11. The system of claim 9 wherein the test system is configured for:
    prior to testing:
        generating a plurality of test messages including the first test message, wherein each of the plurality of test messages includes a plurality of MGIDs, wherein each of the MGIDs is associated with a different message group context.

12. The system of claim 9 wherein the test system is configured for resetting collected statistics associated with a prior message group context group after receiving the first trigger message.

13. The system of claim 9 wherein the test system is configured for generating a message loss metric, a message delay metric, a jitter metric, a message count metric, a message ordering metric, a session related metric, a message group context related metric, or a SUT related metric.

14. The system of claim 9 wherein the SUT includes a network switch, a network router, or a network device.

15. The system of claim 9 wherein the first test message is received at a receive port processor of the test system and wherein the first test message is sent from a transmit port processor of the test system.

16. A non-transitory computer readable medium having stored thereon executable instructions that when executed by at least one processor of a computer cause the computer to perform steps comprising:

during testing of a system under test (SUT):

receiving a first trigger message indicating a first message group context for statistics collection, wherein the first message group context indicates a first group of message parameters for monitoring;

receiving, from the SUT, a first test message of a plurality of test messages, wherein the first test message includes a first message group identifier (MGID) and a second MGID, wherein the first MGID is associated with the first message group context and the second MGID is associated with a second message group context, wherein each unique MGID associated with a respective message group context indicates a unique group of message parameter values for a respective group of message parameters associated with the respective message group context;

performing, using the first MGID, statistics collection associated with the first message group context;

receiving a second trigger message indicating a second message group context for statistics collection;

receiving, from the SUT, a second test message, wherein the second test message includes a third MGID and a fourth MGID, wherein the third MGID is associated with the first message group context and the fourth MGID is associated with the second message group context; and performing, using the fourth MGID, statistics collection associated with the second message group context.

* * * * *

UNITED STATES PATENT AND TRADEMARK OFFICE
CERTIFICATE OF CORRECTION

PATENT NO. : 10,764,148 B2  
APPLICATION NO. : 15/826628  
DATED : September 1, 2020  
INVENTOR(S) : Noah Steven Gintis et al.

Page 1 of 1

It is certified that error appears in the above-identified patent and that said Letters Patent is hereby corrected as shown below:

In the Claims

In Column 18, Line 45, in Claim 10, after "group of" insert -- one or more --.

In Column 18, Line 59, in Claim 12, after "context" delete "group".

Signed and Sealed this  
Tenth Day of November, 2020

Andrei Iancu  
*Director of the United States Patent and Trademark Office*